United States Patent
Borrey

(10) Patent No.: US 12,547,711 B2
(45) Date of Patent: Feb. 10, 2026

(54) OUT-OF-BAND PAIRING FOR WIRELESS NEURAL IMPLANT

(71) Applicant: Neuralink Corp., Fremont, CA (US)

(72) Inventor: Julian C. Borrey, San Mateo, CA (US)

(73) Assignee: NEURALINK CORP., Fremont, CA (US)

( * ) Notice: Subject to any disclaimer, the term of this patent is extended or adjusted under 35 U.S.C. 154(b) by 148 days.

(21) Appl. No.: 18/153,336

(22) Filed: Jan. 11, 2023

(65) Prior Publication Data

US 2024/0232340 A1    Jul. 11, 2024

(51) Int. Cl.
 *G06F 21/55*    (2013.01)
(52) U.S. Cl.
 CPC ...... *G06F 21/554* (2013.01); *G06F 2221/034* (2013.01)
(58) Field of Classification Search
 CPC .................. G06F 21/554; G06F 2221/034
 USPC ......................................................... 726/23
 See application file for complete search history.

(56) References Cited

U.S. PATENT DOCUMENTS

| 10,721,785 | B2 | 7/2020 | Al-Ali | |
| 2014/0185805 | A1* | 7/2014 | Andersen | H04W 12/35 380/270 |
| 2015/0061404 | A1* | 3/2015 | Lamenza | H02J 50/80 307/104 |
| 2021/0007602 | A1 | 1/2021 | Seo et al. | |
| 2021/0012909 | A1 | 1/2021 | Koh et al. | |

OTHER PUBLICATIONS

Beata Jarosiewicz et al., "Virtual Typing by People with Tetraplegia Using a Self-Calibrating Intracortical Brain-Computer Interface," Sci Transl Med. 7 (313) (2015).
"Bluetooth Core Specification," Core Specification Working Group (pp. 743-753, 1579-1585) (2021).

* cited by examiner

*Primary Examiner* — Anthony D Brown
(74) *Attorney, Agent, or Firm* — Oblon, McClelland, Maier & Neustadt, L.L.P.

(57) ABSTRACT

Systems and methods confirm a wireless pairing between an implanted device, such as a neural implant, and an external device, such as a computer or mobile device. The implanted device receives signals from the external device, which may be a varying magnetic field or a set of neural signals. The implanted device decodes the signals to identify a pairing code. Based on determining the pairing code, the implanted device may use this to perform a method of pairing which is not vulnerable to man-in-the-middle attacks. Alternatively, the implanted device can securely provide a pairing code to a helper device which can surface the pairing code to the user for confirmation.

20 Claims, 10 Drawing Sheets

OUT-OF-BAND PAIRING FOR WIRELESS NEURAL IMPLANT

CROSS-REFERENCES TO RELATED APPLICATIONS

Not Applicable

BACKGROUND OF THE INVENTION

Brain-machine interfaces (BMIs) hold tremendous promise for the restoration of sensory and motor function and the treatment of neurological disorders. Most of these applications require fine scale communication—at the level of individual neurons—with large numbers of neurons across multiple brain areas. Advanced neural interfaces will require increasing the number of accessible neurons by many orders of magnitude than what is available by current methods. Reading out information from all of these neurons can be problematic. There is a large amount of information in the form of currents and/or voltages that needs processing and communication to the outside world.

Traditionally, neural interfaces such as a BMI are used in a laboratory setting. In such a setting, the neural interface can communicate with outside devices using wires extending from the brain, and in some cases the brain is partially exposed surgically. However, it is desirable to have a neural interface without unwieldy wired connections. As neural interfaces advance and are developed with different goals, different modes of communicating with the outside world become desirable. One such method is via wireless communication.

Wireless communications have their own challenges, such as the security of the transmitted data. Attacks such as man-in-the-middle (MITM) attacks are possible in wireless transmissions, which can allow an eavesdropper to intercept and decrypt encrypted communications. When transmitting data from the brain, or transmitting outputs from decoding neural data, security is particularly important. Thus, there is a need to securely transmit data to and from the brain wirelessly.

BRIEF SUMMARY OF THE INVENTION

Techniques are provided for preventing attacks during wireless pairing of an implanted device and an external device. Data communicated over a radio link is encrypted via a key determined during the pairing process. The pairing process may also result in the generation of pairing codes used to authenticate each party in the link.

In some embodiments, a method for preventing attacks during a wireless pairing of an implanted device implanted in a subject and an external device includes detecting, by the implanted device a varying magnetic field: analyzing, by the implanted device, the varying magnetic field to identify a pairing code: performing, by the implanted device, a key exchange using the pairing code: determining, by the implanted device, whether values exchanged in the key exchange match: and confirming or rejecting, by the implanted device, a wireless connection between the implanted device and the external device based on determining whether the values exchanged in the key exchange match.

In some aspects, the implanted device is implanted in a brain of the subject: and the external device is a computing device comprising an application for managing the implanted device. In some aspects, the external device is a first external device: and the implanted device comprises an induction coil that receives the varying magnetic field from a second external device.

In some aspects, translating, by the second external device, numerical values corresponding to the pairing code into field strength values corresponding to the varying magnetic field: and inducing, by the second external device, the varying magnetic field in the implanted device.

In some aspects, the second external device is a charging device. In some embodiments, the second external device is a smartphone. In some aspects, the key exchange comprises a Diffie-Hellman key exchange.

In some embodiments, a method for preventing attacks during a wireless pairing of an implanted device implanted in a subject and an external device, the method comprising: detecting, by the implanted device, neural signals from a brain of the subject: analyzing, by the implanted device, the neural signals to identify a pairing code: performing, by the implanted device, a key exchange using the pairing code: determining, by the implanted device, whether values exchanged in the key exchange match: and confirming or rejecting, by the implanted device, a wireless connection between the implanted device and the external device based on determining whether the values exchanged in the key exchange match.

These and other embodiments are described in detail below. For example, other embodiments are directed to systems, devices, computer products, and computer-readable media associated with methods described herein.

BRIEF DESCRIPTION OF THE DRAWINGS

Illustrative aspects of the present disclosure are described in detail below with reference to the following drawing figures. It is intended that embodiments and figures disclosed herein are to be considered illustrative rather than restrictive.

DETAILED DESCRIPTION OF THE INVENTION

Figure 1:
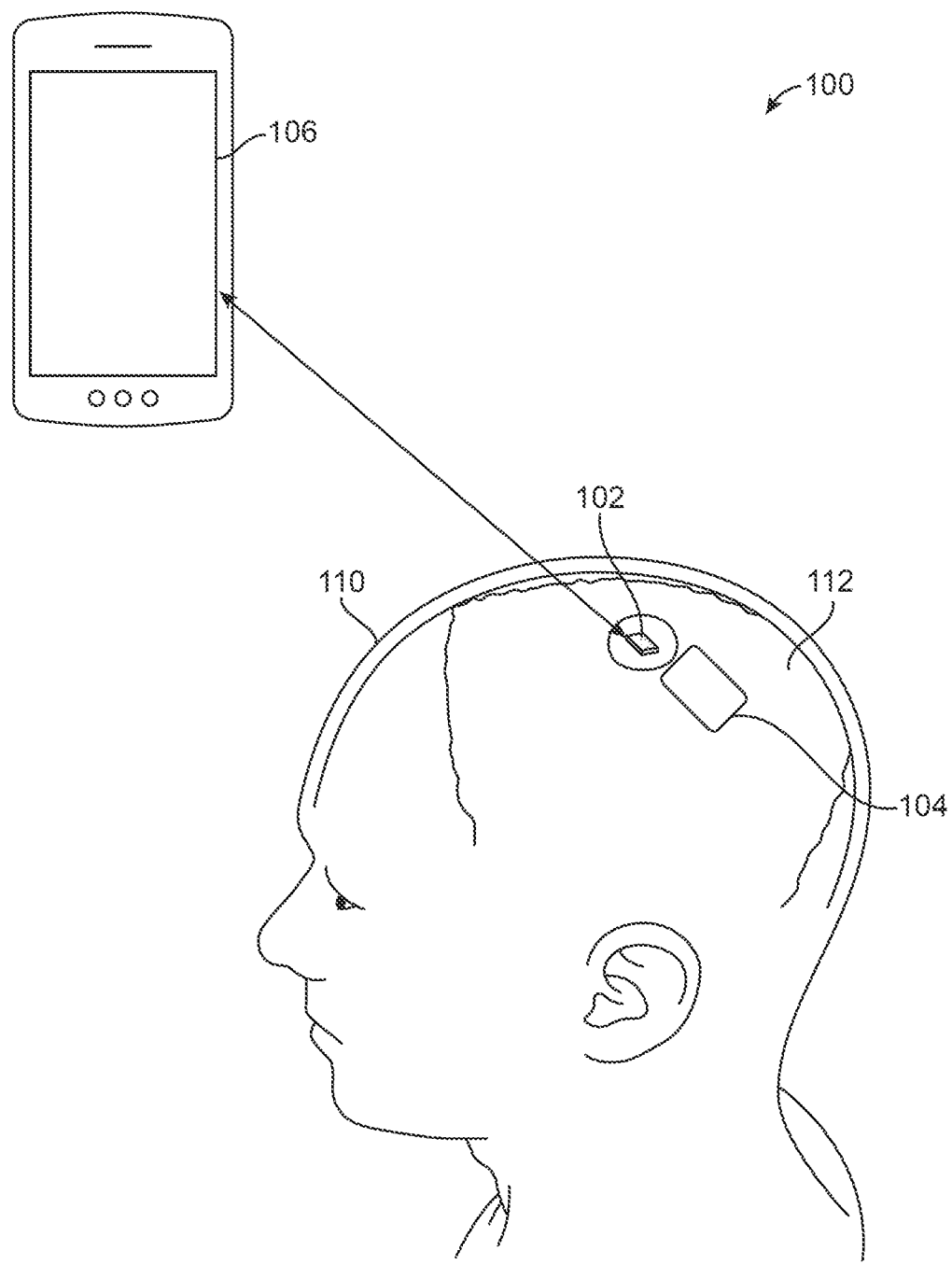
FIG. 1 is a perspective view of a system including an implanted device and an external device according to some embodiments.

Systems and methods prevent attacks such as man-in-the-middle attacks during pairing between an implanted device such as a neural implant and an external device (also referred to herein as a first external device) such as a smartphone or laptop computer. The implanted device and the external device are configured to communicate over a wireless communication channel such as a Bluetooth® wireless network. Such communications can be secured via an out-of-band pairing confirmation. For example, in one type of out-of-band pairing confirmation, a user may pair his smartphone to his car stereo, and confirm the pairing by viewing a code on the car stereo, verifying that it matches the code on the smartphone and confirming the match on both devices, and thus preventing attacks during the pairing of the two devices. Alternatively, out-of-band protection can be performed via one device displaying a passkey, and the user inputting this value into another device. For example, pairing a Bluetooth keyboard to a computer, wherein the key board does not have a display, the computer could display a code, which is then typed into the key board by the user.

Unlike traditional out-of-band pairing, where a user can view and type in a confirmation code using traditional input and output such as a screen and keypad, the implanted device is enclosed in the body of the subject and does not include traditional inputs and outputs. The methods described herein can be used to perform an out-of-band check for implanted devices. Even in the context of implanted devices, certain implants such as neural implants of a BMI are unique. The neural implant may be permanently or semi-permanently disposed beneath the skull of the subject and thus not easily accessible via certain communication channels. The techniques described herein address the unique application of an implanted device such as a neural implant when performing out-of-band pairing confirmation.

The pairing techniques described herein use one or more signals received by the neural implant via an out-of-band channel to perform pairing with an external device. In some embodiments, the signals are received via an external helper device, also referred to herein as a second external device, such as a charger or smart phone. The helper device transmits a pairing code via magnetic inductive coupling. The implanted device detects the magnetic field and decodes the pattern to identify the values. These values are used to verify that an attack (e.g., a MITM attack) is not present. Additionally, the implanted device may transmit the outcome of this match back to the helper device to communicate protection status for the implanted and external device.

In some embodiments, the signals are neural signals. For example, the external device may display a pairing code (e.g., numbers and/or letters), and the subject thinks about typing the values. As the user thinks of typing the values, neural signals are detected and processed. In some embodiments, the subject may simply visualize the displayed pairing code, an event which will generate neural signals which can be detected directly. The implanted device identifies the values, which are used to perform secure pairing which is not vulnerable to MITM attacks.

System Overview

FIG. 1 is a perspective view of a system 100 including an implanted device 102 and an external device 106. The implanted device 102 may be a neural implant implanted in a brain 112 of the subject 110. An example of an implanted device 102 is described in further detail below with respect to FIG. 2. The subject may be a human. Alternatively, the subject may be any suitable multicellular organism including, but not limited to, invertebrates, vertebrates, fish, bird, mammals, rodents (e.g., mice, rats), ungulates, cows, sheep, pigs, horses, and non-human primates.

The system 100 includes one or more implanted devices 102, which may be nestled within burr holes in the cranium of the subject 110. In some implementations, multiple implanted devices are included (not pictured), and individual thin film serial cables run subcutaneously to a relay (not pictured), which has been surgically attached to the mastoid process of the subject 110.

The system 100 further includes an external device 106 which is configured to wirelessly communicate with the implanted device 102. The external device 106 may be a mobile device (e.g., a cellular phone), as depicted in FIG. 1. Alternatively, or additionally, the external device 106 can be a laptop computer, a desktop computer, PDA, tablet computer, net book, personal music player, hand-held specialized reader, wearable device (e.g., watch), vehicle (e.g., car), etc. The external device 106 may include memory, a processor communicatively coupled to the memory, and a computer-readable medium coupled to the processor and including instructions for performing the methods described herein. The external device 106 may include a wireless transceiver for receiving and transmitting wireless signals to and from the implanted device 102. In some embodiments, the external device 106 stores and executes an application for managing the implanted device. For example, the application can display status information about the implanted device (e.g., charge state, operational status, etc.). The application can receive and analyze neural signals or derivatives thereof (e.g., to perform tasks such as typing or moving an object based on neural signals). The application can facilitate the out-of-band check according to some embodiments.

The implanted device 102 and the external device 106 can be configured to wirelessly communicate with one another. In some implementations, the implanted device 102 and the external device 106 communicate with one another via a short-range wireless communication protocol such as Bluetooth® (e.g., IEEE 802.15.1 standard), ZigBee® (e.g., IEEE 802.15.4 standard), or a custom short-range wireless communication protocol. Alternatively, or additionally, the implanted device and the external device 106 communicate with one another via wireless communications over the Internet or other wireless network (e.g., via Wi-Fi).

Figure 2:
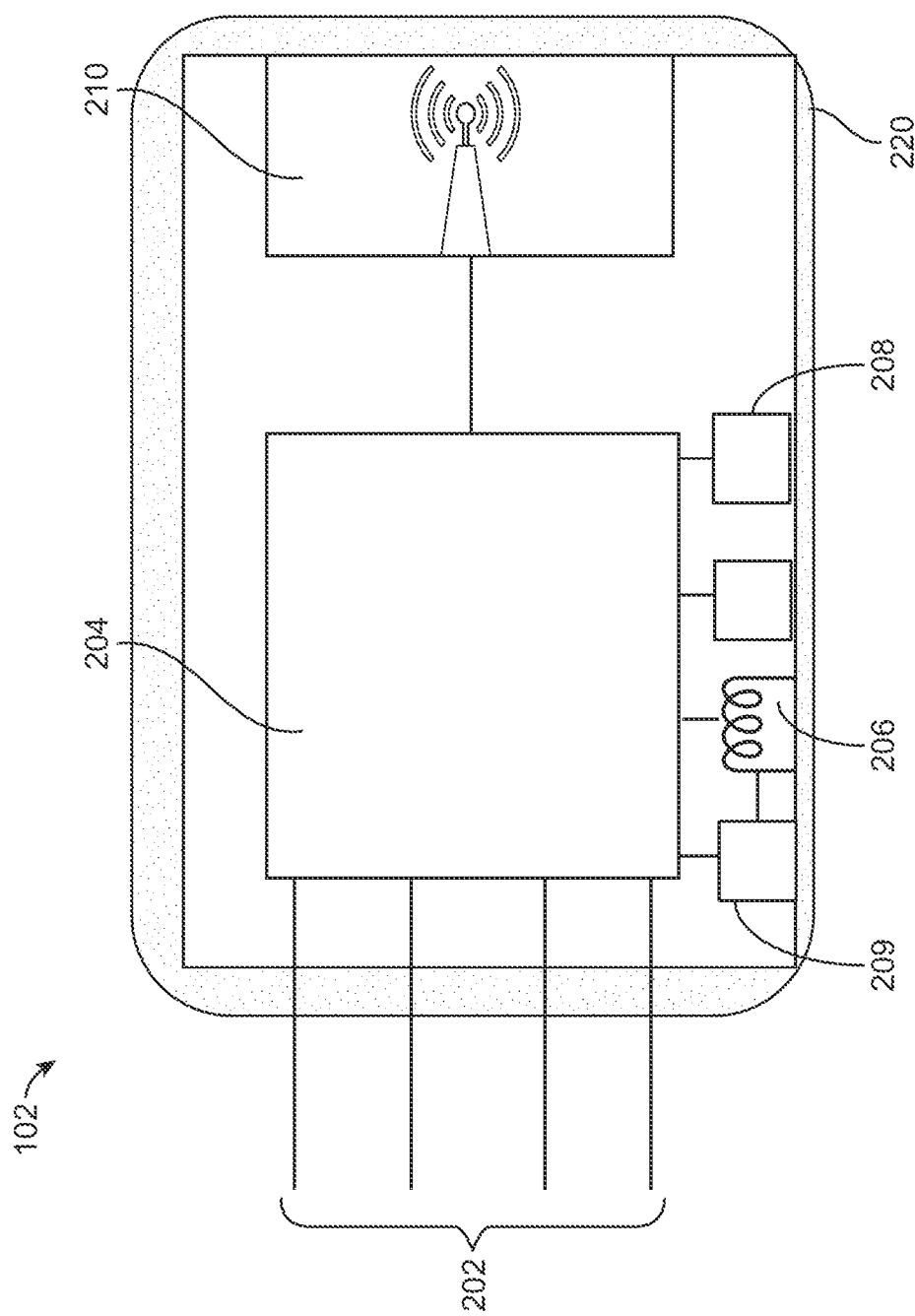
FIG. 2 is a sectional side-view of the implanted device of FIG. 1 according to some embodiments.

The system 100 further includes a charging device 104. The charging device 104 can transmit power to the implanted device 102. The charging device 104 and the implanted device 102 may send and receive power and communications through magnetic induction coils or optically. The charging device can generate a magnetic field, which stimulates a voltage in an inductive receiver coil in the implanted device 102, as shown in FIG. 2. In some embodiments, the charging device 104 can also transport information to the implanted device 102 by modulating the amplitude or frequency, to encode data, as further described below with respect to FIG. 6. In some aspects, the charging device 104 may include UI features, such as a button (i.e., a physical button) or a speaker for receiving simple (e.g., binary) user input or outputting information to the user. The charging device 104 may be disposed on or near the subject for charging and/or communication.

In alternative implementations, data from the implanted device 102, and potentially additional implanted devices 102, are sent through subcutaneous wires underneath the scalp to a relay device (not pictured). The relay device may be disposed under the skin in the mastoid region (behind the subject's ear) or another suitable location. The charging device 104 may be positioned directly over the relay. The relay device sends signals to, and is powered through the skin by, the charging device 104. Such a system with a relay device is described in further detail in U.S. Patent Publication US-2021-0007602-A1, titled "Brain Implant With Subcutaneous Wireless Relay And External Wearable Communication And Power Device," which is incorporated by reference herein in its entirety.

In order to effectively stimulate a specific voltage in the implanted device 102, the charging device 104 may be disposed within a few millimeters of the charging device (or relay, if implemented). The charging device 104 may be placed within about 5 or about 10 mm of the implanted device (e.g., substantially right above the location of the implanted device 102 or relay, on the scalp of the subject). The charging device 104 can be placed in any suitable location as long as the charging device is relatively near to the implanted device 102 so that power can be transmitted to the implanted device 102. In some implementations, the charging device 104 and the external device 106 are separate devices, as shown in FIG. 1. Alternatively, the charging device 104 and the external device 106 may be implemented as a single device.

The charging device 104 contains electronics and communicatively connects to the external device 106 as well as the implanted device 102. The charging device 104 may be affixed with a biocompatible, water-resistant adhesive, positioned for optimal coupling with an implanted device 102 or relay using a pair of magnets. Power and data can be delivered using near-field magnetic induction (or optically or ultrasonically), from the charging device 104 that contains a power source to the implanted device 102 or router. The power source can be a battery, outlet, or other source.

In some implementations, the external device 106 is a first external device, and the system 100 also includes a second external device (not pictured), such as a smartphone, which acts as a helper device as described herein.

Implanted Device

FIG. 2 is a sectional side-view of the implanted device 102 of FIG. 1. The implanted device 102 includes circuitry 204, which may be in the form of custom, low-power integrated circuit (IC) chips for on-board amplification and digitization of data (e.g., neural signals). The implanted device 102 gathers data from flexible electrodes 202 that have been implanted into the brain 112 of the subject 110. The electrodes 202 may be thin film electrodes, sometimes numbering in the hundreds or thousands, inserted into the cortex at precise locations to avoid vasculature. The components of the implanted device 102 can be enclosed in a biocompatible case 220.

The circuitry 204 of the implanted device 102 may include amplifiers, analog-to-digital converters (ADC), and multiplexing electronics to turn the brain signals into time-stamped, serialized digital packets. The circuitry 204 may be configured to gather data from the electrodes 202. The circuitry 204 may be configured to perform spike detection, based on thresholding and/or voltage vs. time analysis of detected neural signals, as described in US Patent Publication US-2021-0012909-A1, titled "Real-Time Neural Spike Detection," which is incorporated by reference herein its entirety. In some implementations, the circuitry 204 includes decoder circuitry configured to identify values based on detected voltages, magnetic fields, motions, and/or neural signals. Some or all of the neural signal voltage, power, time, or other values may then be transmitted via wireless connection to the external device 106 for further analysis.

In some implementations, the implanted device 102 includes a charging coil 206 for receiving power (e.g., an induced magnetic field) from the charging device 104. The charging coil 206 may be an induction coil configured to receive a power form a varying magnetic field from the charging device 104. The charging coil can be housed in the perimeter of the case 220 of the implanted device 102. The charging coil 206 can deliver charge to a small battery 209 in the implanted device 102. Alternatively, in some implementations, the charging coil 206 charges a battery in a relay which is connected to the implanted device 102.

The implanted device 102 may further include a communications component 210, which can be implemented as a wireless transceiver configured to transmit and receive data wirelessly to and from the external device 106. A commercial 2.4 GHZ, or other frequency, TX/RX (transmit/receive) radio can be used as the communications component 210 for both uplink (implanted device 102 to external device 106) and downlink (external device 106 to implanted device) communication.

In an example embodiment, the communications component 210 initiates uplink communication, which is secured via pairing techniques. Given sufficient implant margin and omni-directional antenna patterns of the communications component 210, the implant is robust to misalignment and changes in the operating condition. A connection between the implanted device 102 and the external device 106 may be securely confirmed using the pairing techniques described herein.

Key Exchange for Device Pairing

Figure 3:
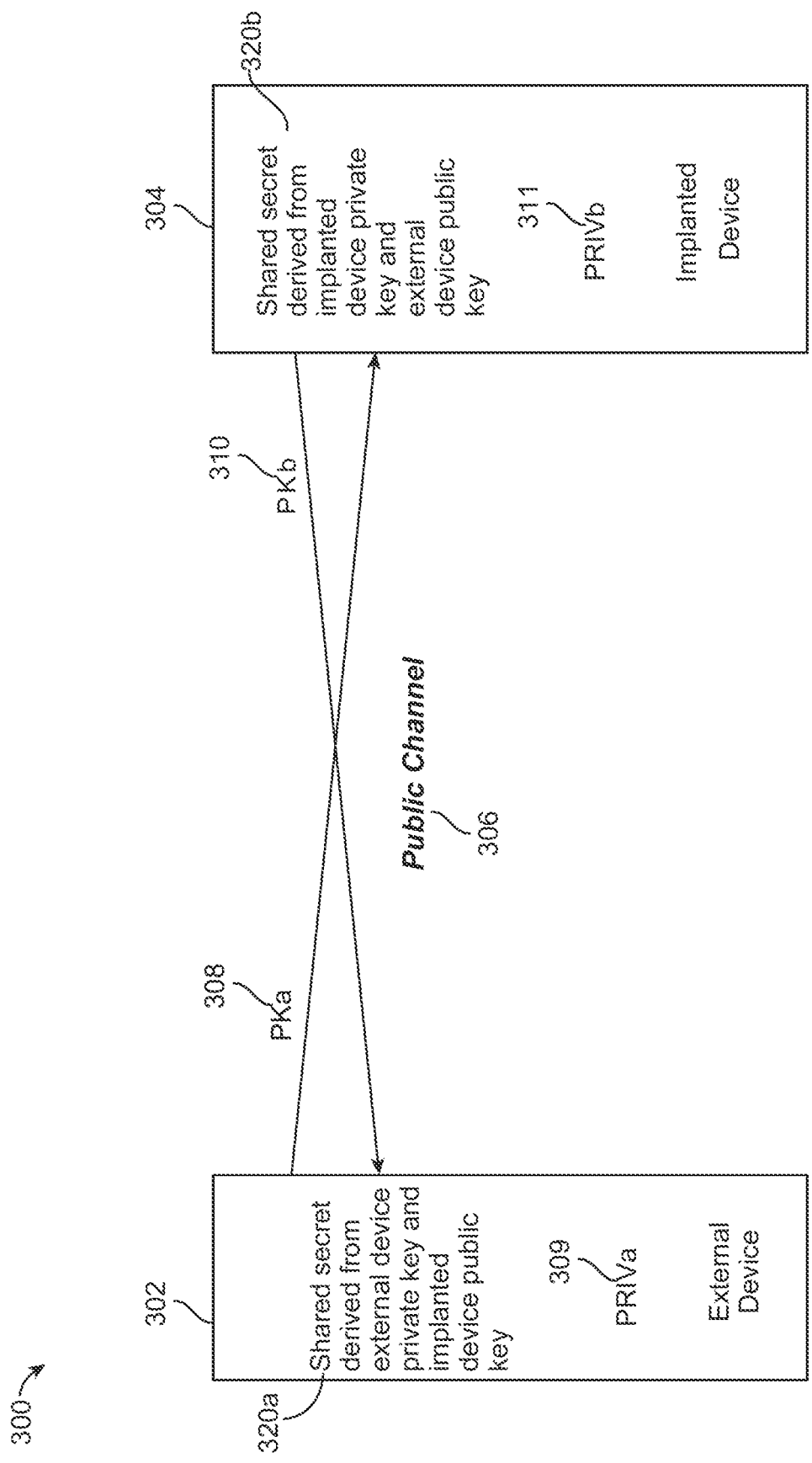
FIG. 3 is a schematic diagram illustrating key exchange for device pairing.

FIG. 3 is a schematic diagram 300 illustrating key exchange for pairing between an implanted device 304 and an external device 302. Using key exchange, the external device 302 and the implanted device 304 can communicate securely over a public channel 306. When two devices are securely paired, they perform a key exchange, which allows the two devices to construct a shared secret on a public channel. The shared secret that is created can be used as an encryption key after the key exchange is done.

The key exchange may involve constructing a shared secret 320a, 320b by sharing public keys between an implanted device 304 and an external device 302 over a public channel 306 (e.g., over the air). This shared secret can then be used as an encryption key after completion of the key exchange. The key exchange may, for example, be a Diffie-Hellman key exchange (DHKE). As shown in FIG. 3, external device 302 generates an external device public key PKa 308 and an external device private key PRIVa 309. For example, the external device public key PKa 308 is the result of computing $g^x$, where x (considered the private key for the external device) is a random number. The external device 302 transmits the external device public key PKa 308 to the implanted device 304 over the public channel 306.

Similarly, the implanted device 304 computes an implanted device public key PKb 310. For example, the implanted device public key PKb 310 is the result of computing $g^y$, where y (considered the private key for the implanted device) is a random number. The implanted device 304 transmits the implanted device public key PKb 310 to the external device 302 over the public channel 306. Based on the public and private keys, the implanted device 304 and the external device 302 compute shared secrets 320a, 320b, which should be equal to one another. The external device 302 computes a shared secret 320a derived from the external device private key PRIVa 309 and the implanted device public key PKb 310. The implanted device 304 computes a shared secret 320b derived from the implanted device private key PRIVb 311 and the external device public key PKa 308, e.g., according to Equation [1], below.

$$S = (g^x)^y = g^{xy} = (g^y)^x \quad [1]$$

Figure 4:
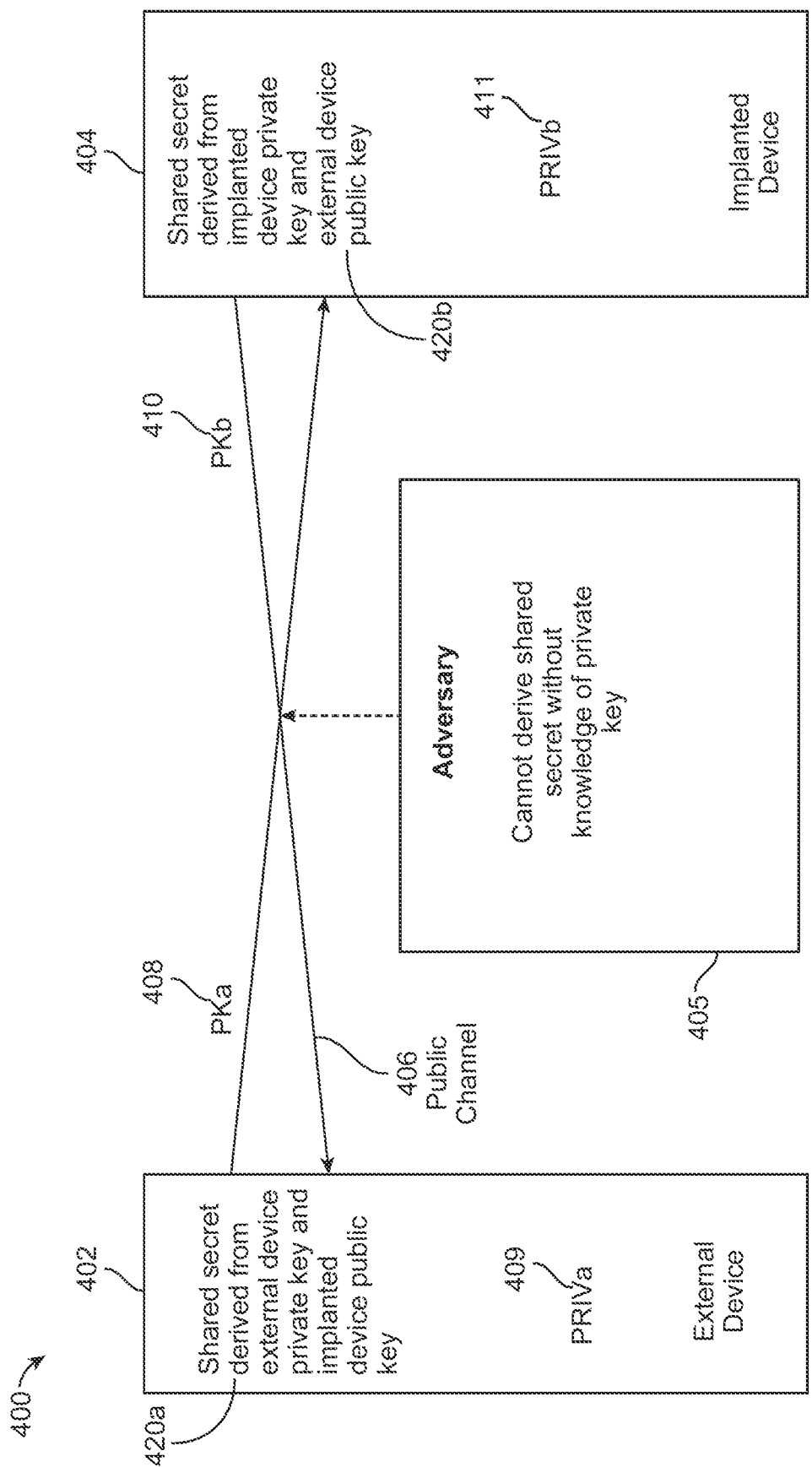
FIG. 4 is a schematic diagram illustrating key exchange for device pairing with an adversary attempting to intercept communications.

FIG. 4 is a schematic diagram 400 illustrating key exchange for pairing between an implanted device 404 and an external device 402, with an adversary 405 attempting to snoop over the public channel 406. As noted above with respect to FIG. 3, the implanted device 404 and the external device 402 may exchange keys, external device public key PKa 408 and implanted device public key PKb 410, over the public channel, and each device can have a respective private key PRIVa 409 and PRIVb 411. An adversary 405 can capture the external device public key PKa 408 and the implanted device public key PKb 410 from the air with relative ease (e.g., using a radio receiver). However, even if the external device public key 408 and the implanted device public key 410 are intercepted by the adversary 405 during transmission over the public channel 306, it is very difficult to derive the shared secret values due to the nature of the shared secret computation. Thus, it is almost impossible for the adversary 405 to reconstruct the shared secret 420 by snooping the external device public key 408 and the implanted device public key 410 over the public channel 406.

Figure 5:
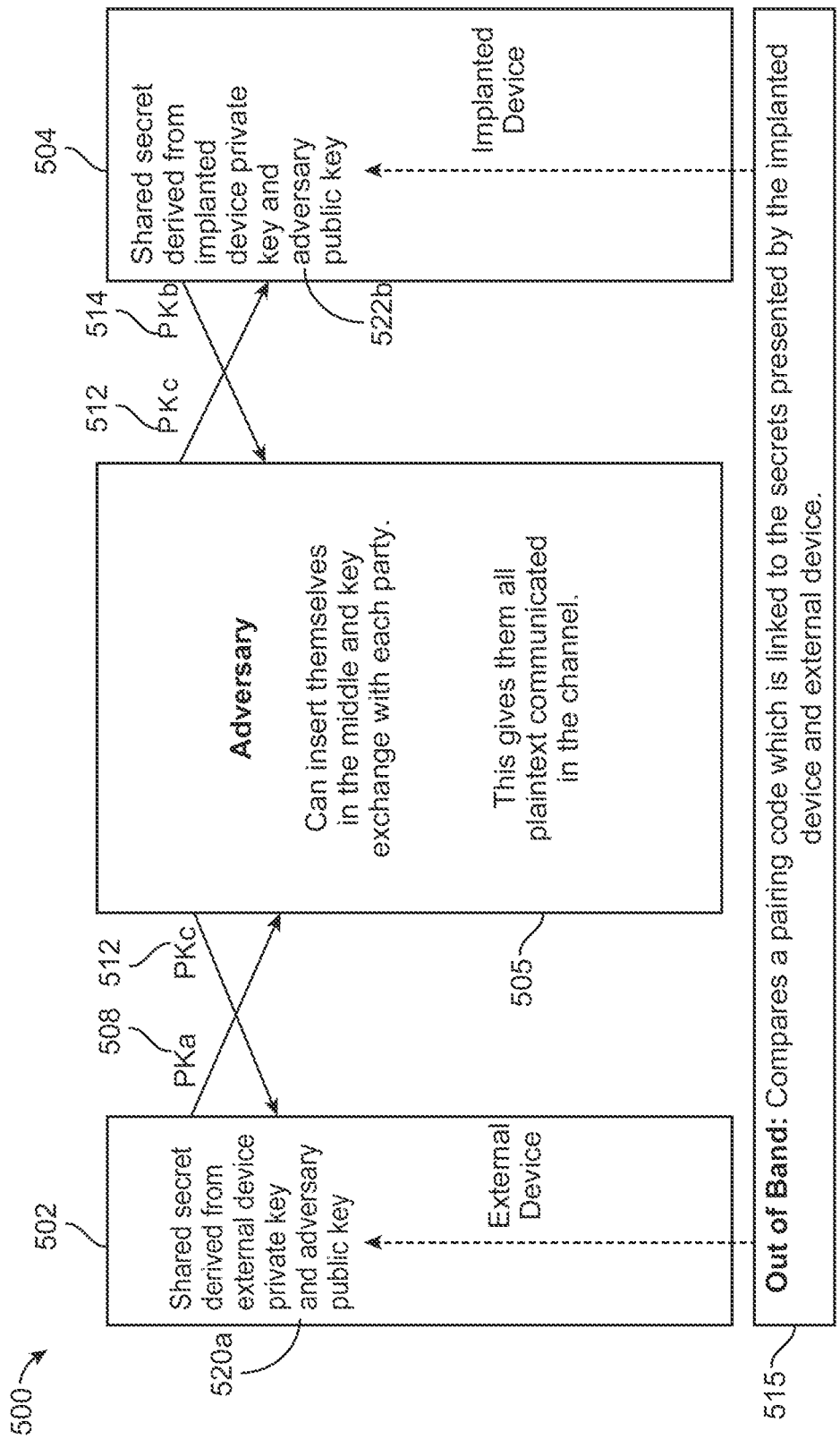
FIG. 5 is a schematic diagram illustrating key exchange for device pairing with an adversary performing a man-in-the-middle attack, and how an out-of-band pairing confirmation can detect the attack.

FIG. 5 is a schematic diagram 500 illustrating key exchange for pairing between an implanted device 504 and an external device 502, with an adversary 505 attempting to perform a man-in-the-middle attack, with an out-of-band check. The adversary 505 inserts themselves in the middle between the external device 502 and the implanted device 504. When the external device 502 sends the external device public key PKa 508 to the implanted device 504 over a public channel, the adversary 505 intercepts the transmission. The adversary 505 sends its own public key PKc 512 to the implanted device, which the implanted device 504 uses in generating its shared secret 520a, which is derived from the external device private key and the adversary public key. Similarly, when the implanted device 504 sends its implanted device public key PKb, towards the external device 502, the adversary 505 intercepts the implanted device public key PKb 514, replacing it with the adversary's own public key PKc 512. Given that the adversary 505 knows the adversary private key PRIVc as well as the external device public key 508 PKa 508 and the implanted device public key PKb 514, the adversary 505 can derive the shared secret 520a, 522b. By executing the man-in-the-middle attack, the adversary 505 gains access to the respective encryption keys, which the adversary 505 can use to obtain plaintext versions of encrypted communications over the public channel.

To prevent data compromise via such man-in-the-middle attacks, an out-of-band check 515 is performed. In an out-of-band check 515, the implanted device 504 and the external device 502 generate values derived from the key exchange to a third party via a separate channel. Techniques for generating suitable values are described in *Bluetooth® Core Specification Version 5.3*. Vol. 2, at §§ 4.2.10 Numeric Comparison and 2.3.5.6.2 Authentication Stage 1—Just Works or Numeric Comparison, pp. 743-744 and 1579-1581 (2021) (hereinafter "Bluetooth® Specification"). These values presented by the implanted device 504 and the external device 502 are compared, and if they do not match up, it is evident that an adversary 505 may be performing a man-in-the-middle attack. Thus, the out-of-band check 515 can be used to confirm or reject a pairing if an adversary 505 is detected. As an example of an out-of-band check, when pairing a mobile phone to a car stereo via Bluetooth®, the mobile phone and/or the stereo may display a series of numbers. A user manually confirms that the numbers match by interacting with a "confirm" button on a user interface.

Figure 6:
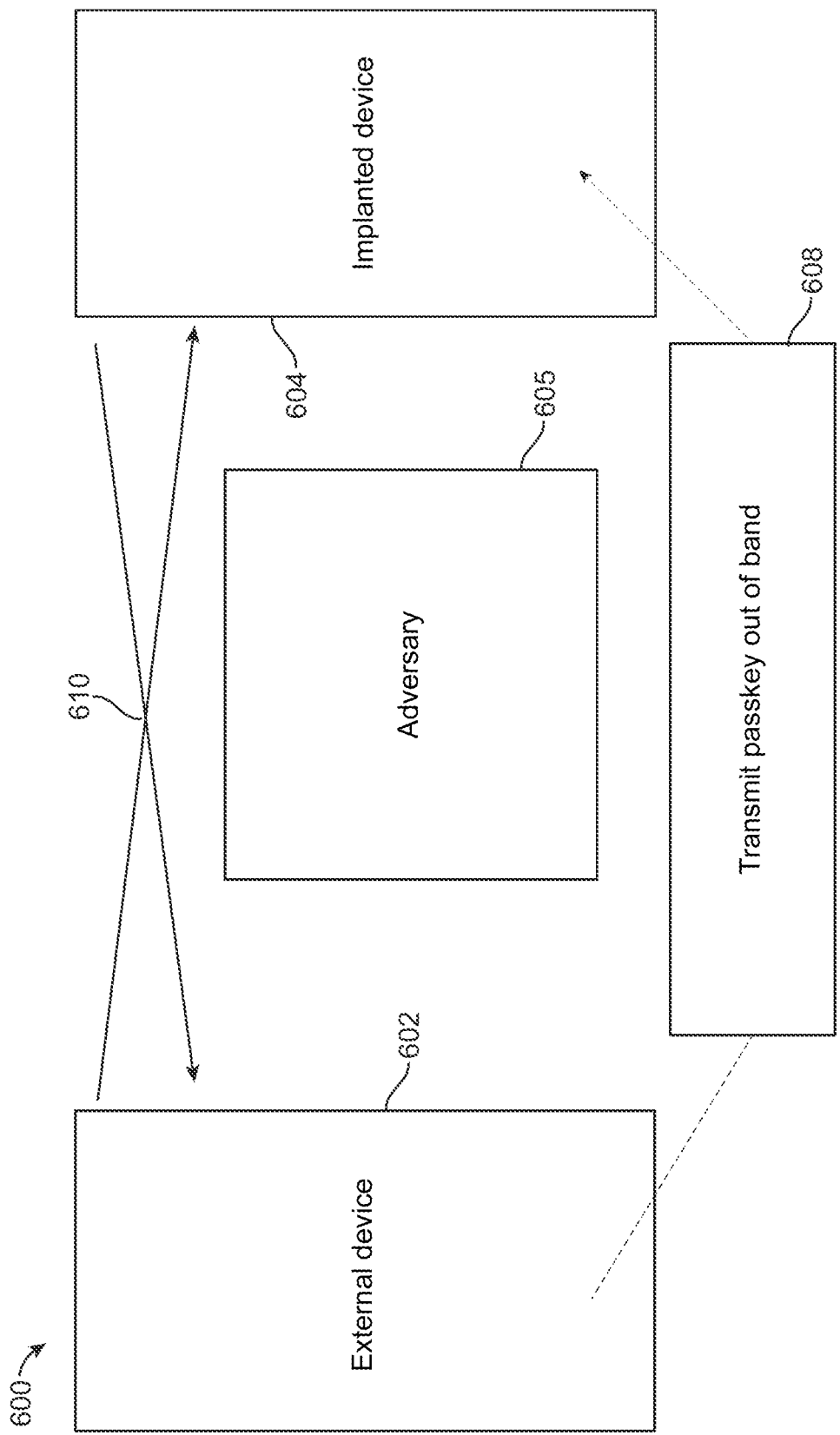
FIG. 6 is a schematic diagram illustrating an out-of-band pairing code being used to enable a secure key exchange which could detect the presence of an adversary and abort the key exchange if detected.

FIG. 6 is a schematic diagram 600 illustrating key exchange for pairing between an implanted device 604 and an external device 602 with a different use for the of out-of-band channel. As described above with respect to FIG. 5, to attempt a MITM attack, the adversary 605 inserts themselves in the middle between the external device 602 and the implanted device 604. As the external device 602 and the implanted device 604 attempt to perform a Diffie-Hellman key exchange 610, the adversary 605 may attempt to perform a MITM attack as described above. To prevent data compromise via such man-in-the-middle attacks, prior to performing the key exchange, a random pairing code is provided by one device and provided to the other device via the secure out-of-band channel.

The out-of-band data transport 608 of FIG. 6 differs from the out-of-band check 515 of FIG. 5 in that a passkey or pairing code is sent one-way from the external device 602 to the implanted device 604. In some implementations, commit-reveal MITM protection is used, as described in Bluetooth® Specification, supra, at "4.2.13 Passkey Entry," p. 747 and "2.3.5.6.3 Authentication Stage 1—Passkey Entry", pp. 1581-1583. The external device 602 transmits the pairing code (also referred to as a passkey in this implementation) to the implanted device 604 prior to the key exchange 610. The external device 602 and the implanted device 604 then engage in a commit-reveal protocol whereby they exchange hash outputs generated from the candidate public keys, a random nonce, and a single bit of the passkey at a time (See f4 at p. 1582 of the Bluetooth® Specification). The generated hash outputs are exchanged for each bit in the passkey (e.g., for all 20 bits in a 20 bit passkey, as described in the Bluetooth® Specification). If a single output does not match the value expected by one of the devices, then the key exchange is aborted. The adversary 605 is unable to perform a MITM attack without knowledge of the passkey bits because they will be unable to consistently guess the hash output expected by the victim device.

Traditionally, out-of-band checks can be performed, for example, by user confirmation of displayed numbers via a keyboard or screen. Such user confirmation via an interface such as a keyboard or screen is useful in many contexts, but would not be feasible in the context of an implanted device without a display screen, keyboard, or buttons. The following techniques can be used to perform an out-of-band check, or out-of-band code transport, to confirm secure pairing between an implanted device and an external device.

Techniques for Preventing Attacks During Pairing

Figure 7:
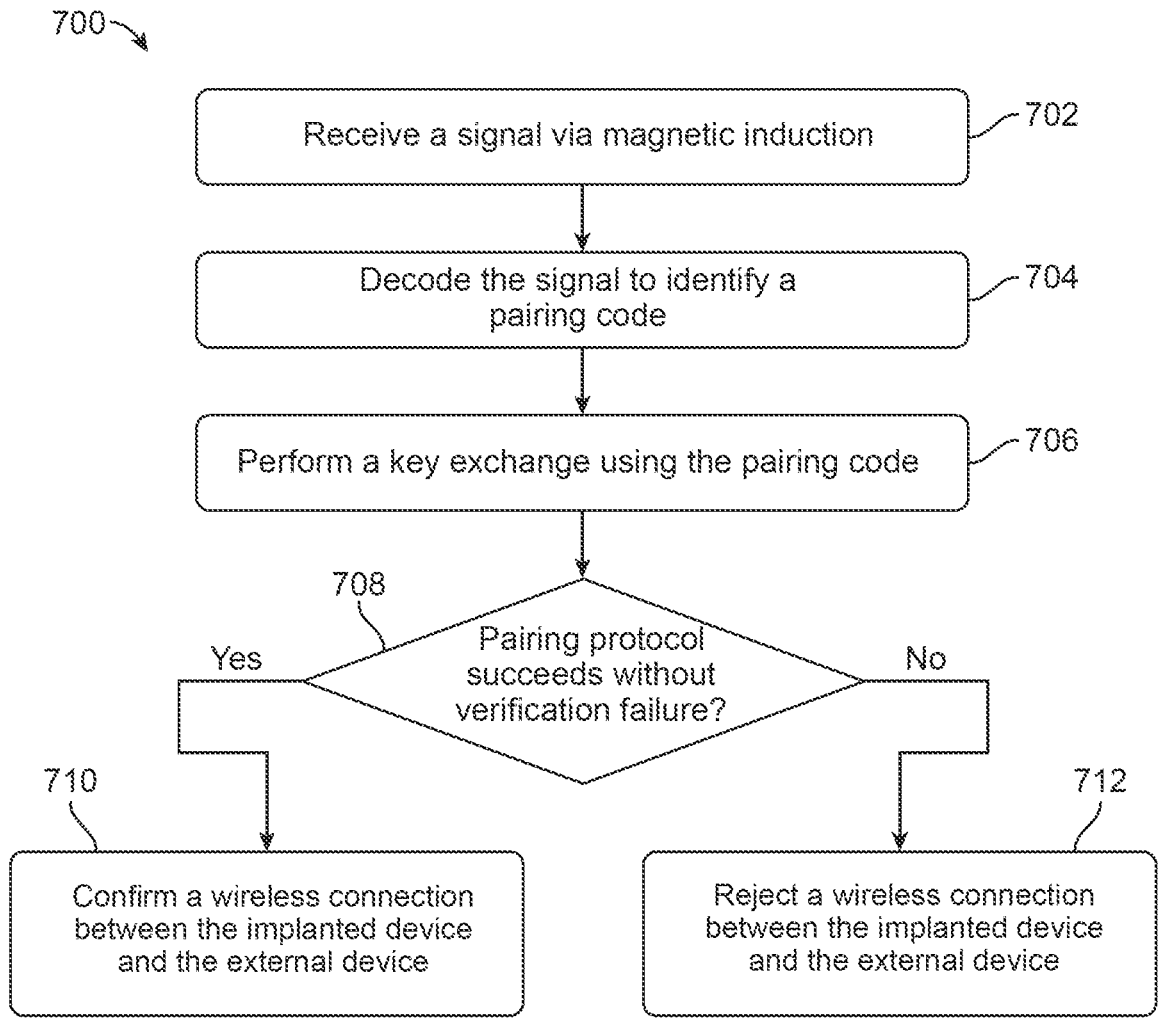
FIG. 7 is a flowchart of a process to prevent attacks during pairing of a neural implant using a varying magnetic field according to some embodiments.
Figure 8:
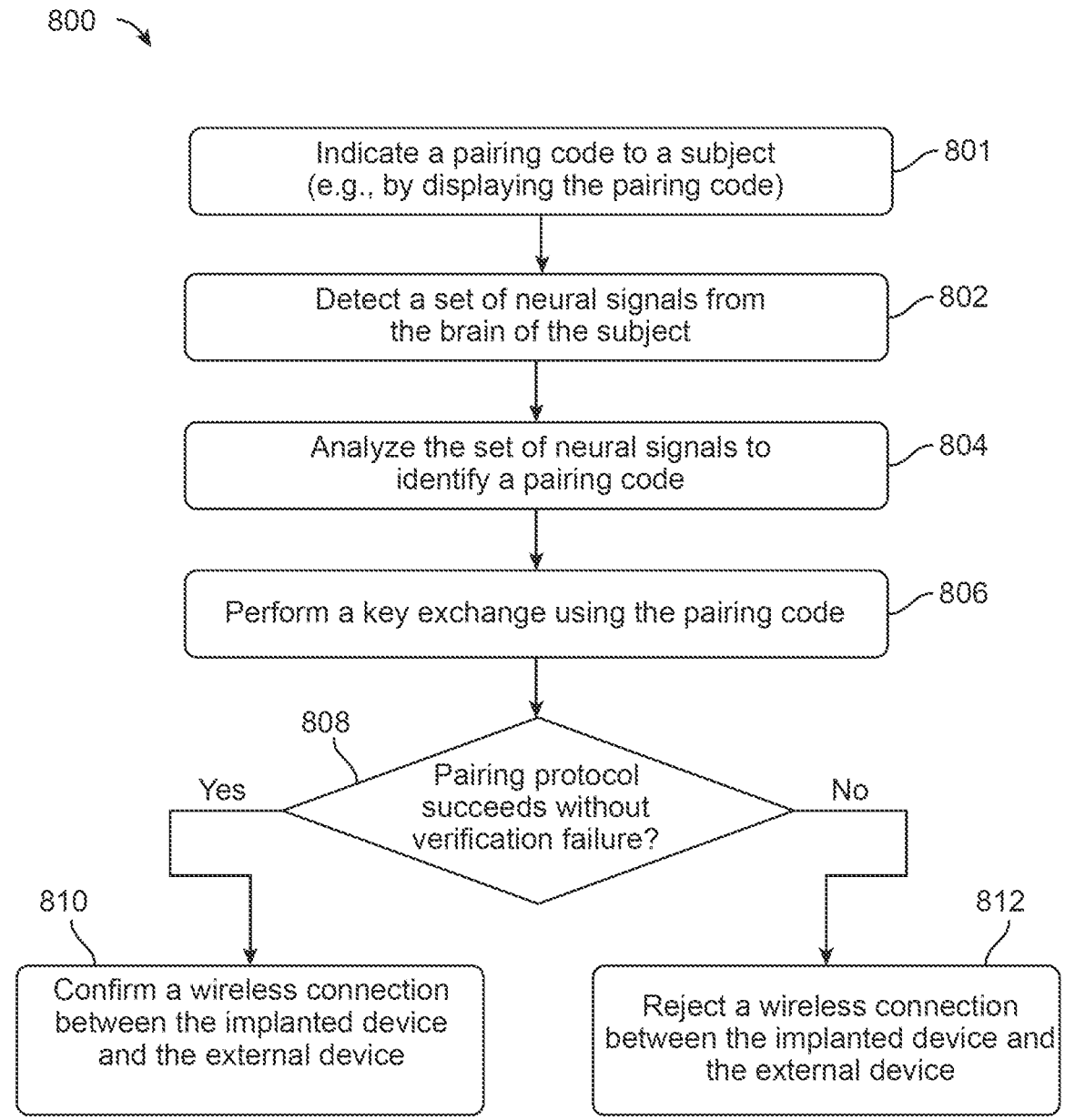
FIG. 8 is a flowchart of another example of a process to prevent attacks during pairing of a neural implant using neural signals according to some embodiments.
Figure 9:
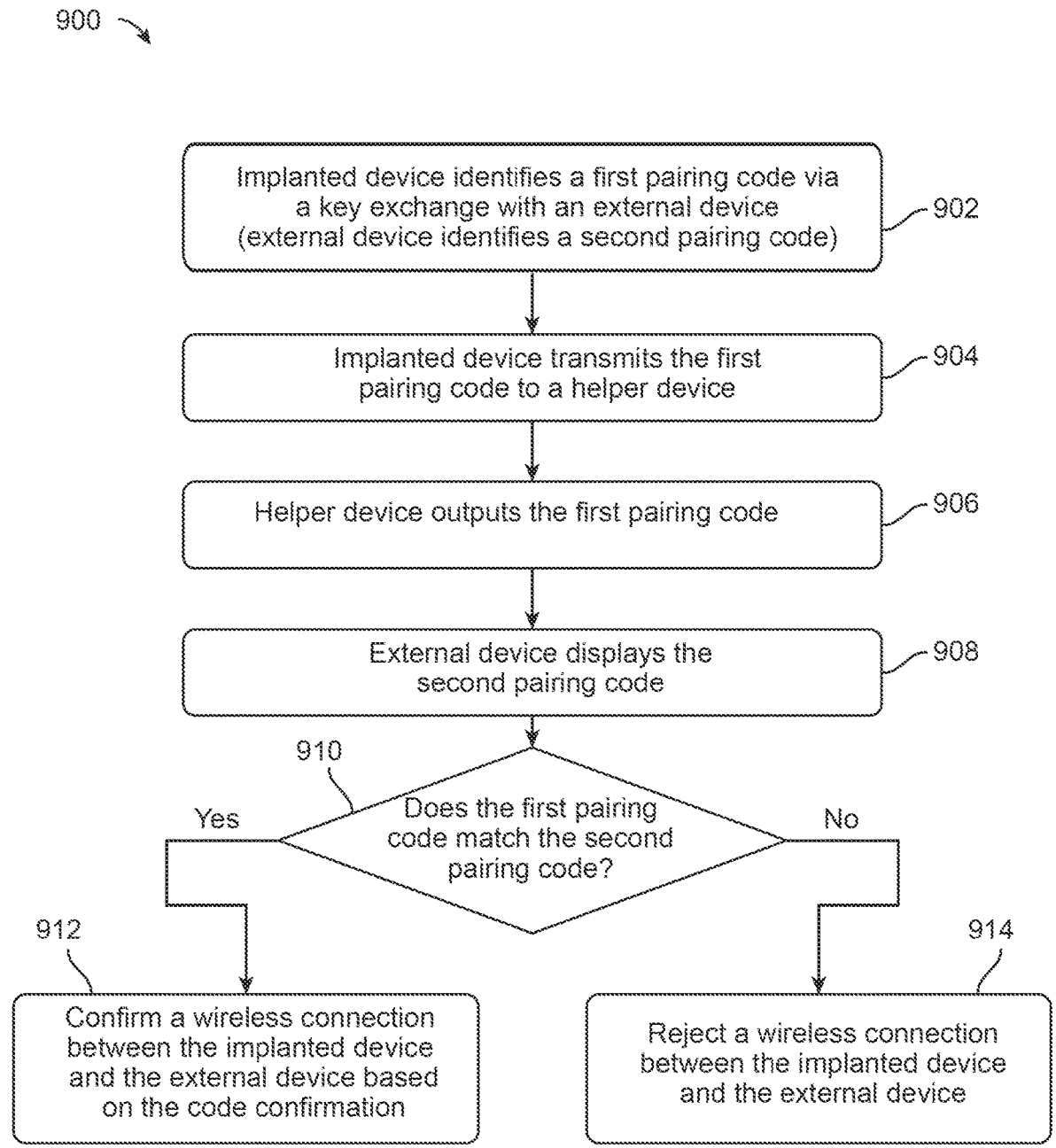
FIG. 9 is a flowchart of another example of a process to prevent attacks during pairing of a neural implant according to some embodiments.

FIGS. 7-9 are flowcharts illustrating techniques for preventing attacks such as MITM attacks during a pairing between an implanted device and an external device. The method of FIG. 7 uses magnetic induction (e.g., from the helper device 104) to perform secure pairing. The method of FIG. 8 uses neural signals to perform secure pairing. The method of FIG. 9 transmits a pairing code from an implanted device to a helper device, which outputs the pairing code to the subject for confirmation.

Secure Pairing Using Magnetic Induction

FIG. 7 is a flowchart illustrating a method 700 of preventing attacks during a pairing between an external device and an implanted device, such as the external device 106 and the implanted device 102 depicted in FIG. 1. The method 700 uses a signal applied via magnetic induction from a helper device, also referred to herein as a second external device, such as a charger or smartphone, for preventing attacks during the pairing. The implanted device can be implanted in the brain, as illustrated in FIG. 1. The external device can be a computing device such as a smartphone, laptop, tablet, etc., which may be executing an application for managing the implanted device, as described above with respect to FIG. 1.

Prior to the processing of FIG. 7, the helper device magnetically induces a signal to the implanted device, directly or via a router. As described above with respect to FIG. 1, the helper device may be part of, or be communicatively coupled to, the external device pairing with the implanted device. The external device first determines a code to use for a commit-reveal scheme. In some implementations, the commit-reveal scheme is part of a key exchange, such as a Diffie-Hellman key exchange, as described above with respect to FIG. 6. In some examples, the external device randomly generates a number to generate a pairing code for use in the method 700 of FIG. 7.

The external device and/or the helper device encodes the pairing code into a varying magnetic field. For example, the external device may use a stored mapping to translate numerical values into field strength values. As a specific example, the external device instructs the charging device to transmit the implanted device a signal that encodes the numbers 928458. The external device identifies the code to transmit to the implanted device, and communicates this to the charger locally, or via a wired or secure wireless connection, to the charging device.

The helper device then generates the varying magnetic field. The charging device can stimulate a coil of the charging device, which stimulates a voltage on the receiver coil in the implant. This voltage is modulated to represent the encoded pairing code. As described above with respect to FIG. 2, the charging device has direct access to a charging coil in the implanted device (e.g., the charging device and implanted device or relay are within a few mm of one another). An adversary being able to stimulate the implanted device to receive a particular signal via magnetic induction (e.g., in an attempt to perform a man-in-the-middle attack) is very unlikely. Thus, the charging device essentially has physical access to the implanted device, providing a secure and effective channel for an out-of-band check.

At block 702, the implanted device receives a magnetic induction pattern from a helper device.

At block 704, the implanted device decodes the magnetic activity to identify a pairing code. The implanted device may, for example, use a stored decoding scheme such as mapping a particular magnetic pattern to a particular numerical value or mapping a particular increase or decrease in magnetic field strength to a particular numerical value.

At block 706, the implanted device performs a key exchange using the pairing code. In some implementations, the key exchange is a Diffie-Hellman key exchange with commit-reveal protection, as described above with respect to FIG. 6. For example, the implanted device and the external device engage in a commit-reveal protocol whereby The implanted device and the external device exchange hash values generated from the implanted device and external device public keys, a random nonce, and a single bit of the pairing code at a time (e.g., via function f4 as described at page 1582 of the Bluetooth® Specification, supra). This occurs for each bit in the pairing code.

At block 708, the implanted device determines whether any transactions did not pass verification. In other words, the implanted device determines whether the pairing protocol succeeds without verification failure. As described above, the key exchange may involve the exchange of values between the implanted device and the external device, such as hash values generated from the implanted device and external device public keys, a random nonce, and a single bit of the pairing code at a time. If each hash value received from the external device for each bit in the pairing code matches the corresponding hash value generated by the implanted device, then each transaction verified correctly and the key exchange can be considered successful. If a single output does not match the value expected by the implanted device, this can indicate that an adversary is attempting to perform an attack such as a MITM attack. Likewise, the external device may determine verification status in a similar fashion.

At block 710, the implanted device confirms a wireless connection between the implanted device and the external device based on determining that values exchanged in the key exchange match. Based on determining that the values exchanged in the key exchange match at block 708, the implanted device proceeds with encrypted communications with the external device. These communications can be encrypted using a shared secret computed based on the exchanged keys, based on confirming that the values exchanged in the key exchange match. Likewise, the external device may confirm the wireless connection in a similar fashion.

At block 712, upon determining that the values exchanged in the key exchange do not match, the implanted device rejects the wireless connection between the implanted device and the external device. If the values do not match, it is likely that an adversary is attempting a man-in-the middle attack. Accordingly, the implanted device will not continue with the pairing process. In some aspects, if the values exchanged in the key exchange do not match, then the key exchange is aborted. An adversary is unable to perform an attack such as a MITM attack without knowledge of the pairing code bits because they will be unable to consistently guess the hash value expected by either device. Likewise, the external device may reject the wireless connection in a similar fashion.

Secure Pairing Using Neural Signal Analysis

FIG. 8 is a flowchart illustrating a method 800 of preventing attacks during a pairing between an external device and an implanted device, such as the external device 106 and the implanted device 102 depicted in FIG. 1. The method 800 uses a detected set of neural signals for preventing attacks during the pairing. The implanted device can be implanted in the brain, as illustrated in FIG. 1. The external device can be a computing device such as a smartphone, laptop, tablet, etc., which may be executing an application for managing the implanted device, as described above with respect to FIG. 1.

Prior to the processing of FIG. 8, the external device determines a pairing code to use for preventing attacks during the pairing (e.g., as described above with respect to FIG. 7).

At block 801, the external device indicates the pairing code to the subject. For example, an application executing on the external device displays, via a graphical user interface (GUI) displayed on a display component (e.g., a screen) of the external device, the pairing code (e.g., 9454535 or alkl390i). The user may then, e.g., view the pairing code on external device's screen. As another example, the external device provides a series of numbers to the subject via audio output. Responsive to the indication of the pairing code, the subject may think of, or think of typing, the pairing code. The implant is thus able to receive this code, even though it has no traditional input methods, such as a keyboard or touchpad. Thus, the values thought of by the subject within whom the implanted can provide a secure and effective out-of-band check. The techniques of FIG. 8 may in some cases be applied to perform a subsequent pairing confirmation after the implanted device has been calibrated, potentially after performing an initial out-of-band check using the techniques of FIG. 7 or FIG. 9.

At block 802, the implanted device detects a set of neural signals from the brain of the subject. The neural signals are detected via a plurality of electrodes implanted in the brain of the subject and communicatively coupled to the implanted device. As the subject thinks about the pairing code (e.g., writing or typing the values), neural signals characterizing the pairing code are transmitted, via the electrodes, to the implanted device.

At block 804, the implanted device analyzes the set of neural signals to identify the pairing code. The circuitry of the implanted device may analyze the neural signals to identify the pairing code. For example, the subject is instructed to think of typing or writing the values. Electrodes implanted in regions of the brain associated with the hand are targeted. The input from these electrodes is analyzed to identify action potentials associated with neural spikes and associated power values. This information is analyzed using a decoder to identify the values that the subject is thinking of typing or writing. Techniques for decoding neural signals to identify typed values are described in further detail in Beata Jarosiewicz et al., "Virtual Typing by People with Tetraplegia Using a Self-Calibrating Intracortical Brain-Computer Interface," Sci Transl Med. 7 (313) (2015). In some implementations, the decoding is performed on-chip by the circuitry of the implanted device. In alternative implementations, the neural signal data is transmitted to the external device for the decoding.

At block 806, the implanted device performs a key exchange using the pairing code. The key exchange can be performed as described above with respect to block 706 of FIG. 7.

At block 808, The implanted device determines whether any transactions did not pass verification. In other words, the implanted device determines whether the pairing protocol succeeds without verification failure, which may be performed as described above with respect to block 708 of FIG. 7.

In some aspects, the implanted device further transmits an indication of whether the values exchanged in the key exchange match to the user via stimulation of neurons. The implanted device may encode such an indication in a similar manner as described above with respect to decoding the neural signals. The implanted device may then stimulate the neurons by transmitting a voltage according to the encoded indication.

At block 812, the implanted device confirms a wireless connection between the implanted device and the external device based on determining that the values exchanged in the key exchange match. Based on determining that the values exchanged in the key exchange match at block 808, the implanted device proceeds with encrypted communications with the external device. These communications can be encrypted using a shared secret computed based on the exchanged keys, based on confirming that the values exchanged in the key exchange match.

At block 814, upon determining that the values exchanged in the key exchange do not match, the implanted device rejects the wireless connection between the implanted device and the external device. If the values do not match, it is likely that an adversary is attempting a man-in-the middle attack. Accordingly, the implanted device will not continue with the pairing. determining that the first pairing code does not match the second pairing code, the implanted device rejects the wireless connection between the implanted device and the external device. If the numbers do not match, it is likely that an adversary is attempting a man-in-the middle attack. Accordingly, the implanted device will not continue with the pairing.

Code Pairing Confirmation

FIG. 9 is a flowchart illustrating a method 900 of preventing attacks during a pairing between an external device and an implanted device, such as the external device 106 (e.g., a first external device) and the implanted device 102 depicted in FIG. 1. The method 900 uses two pairing codes derived from the key exchange performed between the implanted device and the external device for preventing attacks during the pairing. The implanted device can be implanted in the brain of a subject, as illustrated in FIG. 1. The external device can be a computing device such as a smartphone, laptop, tablet, etc., and may be executing an application for managing the implanted device, as described above with respect to FIG. 1. In the method 900 of FIG. 9, the subject verifies pairing codes output by the implanted device and the external device.

At block 902, the implanted device identifies a first pairing code via a key exchange. The implanted device may, for example, perform a Diffie-Hellman key exchange with the external device as described above with respect to FIG. 3. The external device also determines a second pairing code via the key exchange in a similar fashion. As described above, in a successful key exchange, the first pairing code is the same as the second pairing code.

At block 904, the implanted device transmits the first pairing code to a helper device (e.g., a second external device), which may be a charger or smart phone. The implanted device may transmit the first pairing code to the charging device via a direct connection. As described above with respect to FIG. 1, the charging device may be mounted to, or adjacent to, the subject. The implanted device may transmit a signal to the charging device indicative of the first pairing code. The helper device, which in some embodiments could be a smart phone, may receive the code from the implanted device via short range communication, such as NFC (near-field communication).

At block 906, the charging device outputs the first pairing code. For example, the charging device includes a speaker, and outputs the first pairing code audibly to the subject. In some aspects, the charging device further provides audio output asking the subject to confirm the pairing code as further described below at block 910. As another example, in the case of a smartphone helper device, the code is shown on a screen of the smartphone via an application for managing the implanted device.

At block 908, the external device displays a second pairing code. As described above at block 902, in the key exchange, the external device may identify a second pairing code, which may be equal to the second pairing code if the exchange is successful (e.g., in absence of a man-in-the-middle attack). The external device may, for example, display the second pairing code on a screen. Alternatively, or additionally, the external device may output the second pairing code using other suitable means, such as audibly outputting the second pairing code.

The subject views and/or listens to the provided first pairing code and second pairing code, and determines whether the pairing codes match. The subject may compare the first pairing code provided by the helper device to the second pairing code provided by the external device and determine whether the codes match.

At block 910, the external device and the implanted device determines whether the first pairing code match the second pairing code. In some aspects, the determination is based on whether a code confirmation is received from the subject. In some embodiments, the external device and/or helper device prompt the user to provide the code confirmation. If the codes match, the user provides the code confirmation, and if the codes do not match, then the user refrains from providing the code confirmation. Thus, the implanted device receives the code confirmation via the helper device responsive to transmitting the first pairing code to the helper device, and the code confirmation indicates a match between the first pairing code and a second pairing code output by the external device.

In some embodiments, to receive the code confirmation, the external device displays a button or icon, such as a "confirm" button on a screen, that the subject clicks to provide confirmation to the external device.

In some embodiments, the helper device receives the code confirmation by detecting a signal that is transmitted when the subject clicks a physical or touch screen button on the helper device to provide confirmation. If the helper device receives confirmation (e.g., by detecting a button click), then the helper device transmits a code confirmation command (e.g., a signal indicating the confirmation had been received) to the implanted device. In some aspects, the helper device induces voltage in the implanted device to transmit the indication of code confirmation.

At block 912, the implanted device confirms a wireless connection between the implanted device and the external device based on determining that the code confirmation is received. Based on determining that the confirmation is received, the implanted device proceeds with encrypted communications with the external device. These communications can be encrypted using a shared secret computed based on the exchanged keys. Likewise, based on determining that the code confirmation is received, the external device confirms the connection and proceeds with the encrypted link.

At block 914, upon determining that the first pairing code does not match the second pairing code, the implanted device rejects the wireless connection between the implanted device and the external device. If the code confirmation is not received, this could indicate that the pairing codes do not match, and it is possible that an adversary is attempting a man-in-the middle attack. Accordingly, the implanted device will not continue with the pairing. Likewise, based on determining that the code confirmation is not received, the external device rejects the wireless connection with the implanted device.

Example Computer System

Figure 10:
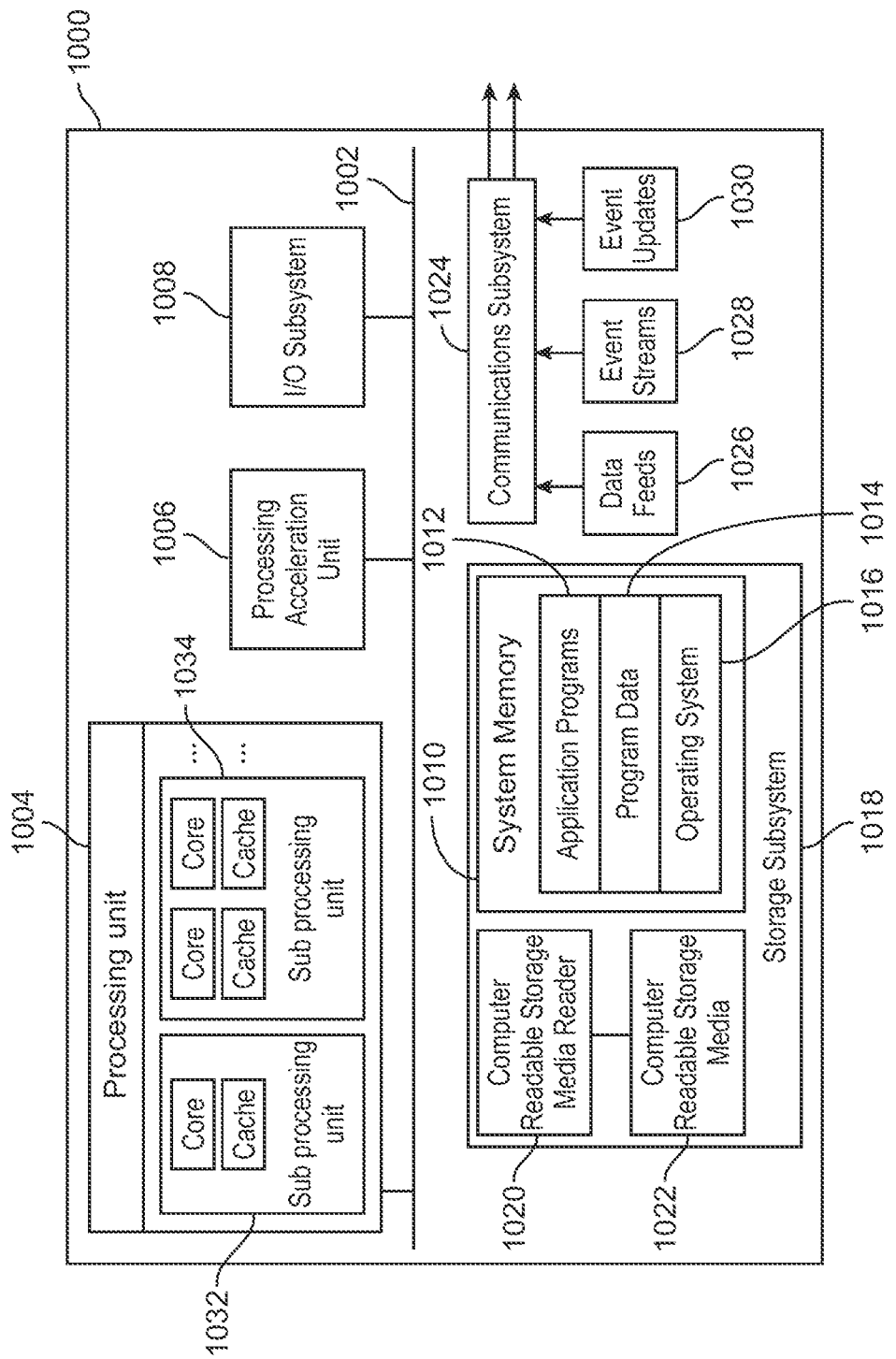
FIG. 10 illustrates an example computer system that may be used to implement certain embodiments.

FIG. 10 illustrates an example computer system 1000 that may be used to implement certain embodiments. For example, in some embodiments, computer system 1000 may be used to implement the external device described above. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, positron emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that can further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, the communication subsystem may be used to receive speech input from a client device and send a value to the client device in response.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

It should be appreciated that the robotic system handling, coupling with, and engaging with one or more portions of a probe device can include a control system (or microprocessor controller) having one or more microprocessors/processing devices that can further be a component of the overall system. The control system can be local or remote to the robotic system, and can also include a display interface and/or operational controls configured to be handled by a user to alter the program of the robotic arm, to visualize the probe device, to visualize biological tissue into which the probe device is being inserted, and change configurations of the robotic device, and sub-portions thereof. Such processing devices can be communicatively coupled to a non-volatile memory device via a bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, Java, Python, Perl, JavaScript, etc.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A method for preventing attacks during a wireless pairing of an implanted device implanted in a subject and a first external device, the method comprising:
    receiving, by the implanted device from a second external device, a varying magnetic field that includes a pairing code, the second external device being different from the first external device and the implanted device,
    detecting, by the implanted device, the varying magnetic field received from the second external device that includes the pairing code;
    analyzing, by the implanted device, the varying magnetic field received from the second external device that includes the pairing code to identify the pairing code;
    performing, by the implanted device, a key exchange using the pairing code;
    determining, by the implanted device, whether values exchanged in the key exchange match; and
    confirming or rejecting, by the implanted device, a wireless connection between the implanted device and the first external device based on determining whether the values exchanged in the key exchange match.

2. The method of claim 1, wherein:
    the implanted device is implanted in a brain of the subject; and
    the first external device is a computing device comprising an application for managing the implanted device.

3. The method of claim 1, wherein:
    the implanted device comprises an induction coil that receives the varying magnetic field from the second external device.

4. The method of claim 3, further comprising:
    translating, by the second external device, numerical values corresponding to the pairing code into field strength values corresponding to the varying magnetic field; and
    inducing, by the second external device, the varying magnetic field in the implanted device.

5. The method of claim 3, wherein:
    the second external device is a charging device.

6. The method of claim 3, wherein:
    the second external device is a smartphone.

7. The method of claim 1, wherein:
    the key exchange comprises a Diffie-Hellman key exchange.

8. A method for preventing attacks during a wireless pairing of an implanted device implanted in a subject and an external device, the method comprising:
    detecting, by the implanted device, neural signals from a brain of the subject;
    analyzing, by the implanted device, the neural signals to identify a pairing code;
    performing, by the implanted device, a key exchange using the pairing code;
    determining, by the implanted device, whether values exchanged in the key exchange match; and
    confirming or rejecting, by the implanted device, a wireless connection between the implanted device and the external device based on determining whether the values exchanged in the key exchange match.

9. The method of claim 8, wherein the neural signals are detected via a plurality of electrodes implanted in the brain of the subject and communicatively coupled to the implanted device.

10. The method of claim 8, further comprising:
    indicating, by the external device, the pairing code to the subject,
    wherein the neural signals are detected responsive to the indicating of the pairing code.

11. The method of claim 8, wherein:
    the external device is a computing device comprising an application for managing the implanted device.

12. The method of claim 8, wherein:
    the key exchange comprises a Diffie-Hellman key exchange.

13. A method for preventing attacks during a wireless pairing of an implanted device implanted in a brain of a subject and a first external device, the method comprising:
    identifying, by the implanted device, a first pairing code via a key exchange with the first external device;
    transmitting, by the implanted device, the first pairing code to a second external device to output the first pairing code;
    responsive to transmitting the first pairing code to the second external device, receiving, by the implanted device, a code confirmation from the subject via the second external device, wherein the code confirmation indicates a match between the first pairing code and a second pairing code output by the first external device; and confirming, by the implanted device, a wireless connection between the implanted device and the first external device based on receiving the code confirmation.

14. The method of claim 13, wherein:
the second external device outputs the first pairing code audibly to the subject for confirmation.

15. The method of claim 13, wherein:
the first external device identifies the second pairing code via the key exchange; and
the first external device displays the second pairing code to the subject for confirmation.

16. The method of claim 13, wherein:
the second external device is a charging device.

17. The method of claim 13, wherein:
the second external device is a smartphone.

18. The method of claim 13, wherein:
the first external device is a computing device comprising an application for managing the implanted device.

19. The method of claim 13, wherein:
the key exchange comprises a Diffie-Hellman key exchange.

20. The method of claim 1, wherein:
the second external device is a helper device or a charging device that is configured to transmit power to the implanted device.

* * * * *